(12) United States Patent  
Wan

(10) Patent No.: US 6,836,971 B1
(45) Date of Patent: Jan. 4, 2005

(54) SYSTEM FOR USING A 2-AXIS MAGNETIC SENSOR FOR A 3-AXIS COMPASS SOLUTION

(75) Inventor: Hong Wan, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/630,187

(22) Filed: Jul. 30, 2003

(51) Int. Cl.[7] ............................................. G01C 17/38
(52) U.S. Cl. ...................................................... 33/356
(58) Field of Search ............................ 33/356; 702/92, 702/93

(56) References Cited

U.S. PATENT DOCUMENTS

| | | | | |
|---|---|---|---|---|
| 4,698,912 A | * | 10/1987 | Fowler et al. ................. | 33/356 |
| 5,946,813 A | * | 9/1999 | Nachbaur et al. ............. | 33/357 |
| 6,009,629 A | * | 1/2000 | Gnepf et al. .................. | 33/356 |
| 6,539,639 B2 | * | 4/2003 | Smith ........................... | 33/356 |
| 6,651,003 B2 | * | 11/2003 | Woloszyk et al. ............. | 33/356 |

* cited by examiner

*Primary Examiner*—Christopher W. Fulton
(74) *Attorney, Agent, or Firm*—McDonnell Boehnen Hulbert & Berghoff LLP

(57) ABSTRACT

A tilt-compensated electronic compass can be realized by calculating rather than measuring Earth's magnetic field component Z in a direction orthogonal to the two measurement axes of a 2-axis magnetic sensor. The orthogonal component Z can be calculated using a stored value for the Earth's magnetic field strength applicable over a wide geographic region. The calculation also requires using measured field values from the 2-axis sensor. Once Z is known, and using input from a 2-axis tilt sensor, compensated orthogonal components X and Y can be calculated by mathematically rotating the measured field strength values from a tilted 2-axis sensor back to the local horizontal plane. Thus, a very flat and compact tilt-compensated electronic compass is possible.

9 Claims, 3 Drawing Sheets

SYSTEM FOR USING A 2-AXIS MAGNETIC SENSOR FOR A 3-AXIS COMPASS SOLUTION

FIELD

The present invention relates generally to compasses, and more particularly, to electronic compasses.

BACKGROUND

For centuries, navigators and others have indirectly used the Earth's magnetic field to determine direction. This is possible because the magnetic field has a component parallel to the Earth's surface that always points toward magnetic north, and this north-indicating component can be detected with a compass. The magnetic field can be approximated with a dipole model where the field points down toward north in the northern hemisphere, is horizontal and pointing north at the equator, and points up toward north in the southern hemisphere.

The magnitude of the Earth's magnetic field remains somewhat constant over fairly large areas, and ranges from about 0.4 to 0.6 gauss over most of the northern hemisphere. Solid-state electronic devices are now sensitive enough to easily measure the Earth's magnetic field. The accuracy of electronic compasses is somewhat dependent on the tilt of the compass itself: if a compass is held perfectly flat (that is, parallel with the local horizontal plane, which is simply the plane that is perpendicular to the Earth's gravitational vector), the compass heading is defined as:

$$\text{Heading} = arcTan(Y/X) \quad (1)$$

where X and Y represent the Earth's horizontal magnetic field components in the forward and left-right directions, respectively. Heading is the angle in the horizontal plane measured clockwise from true north.

However, compasses are not usually confined to perfectly horizontal orientations, but are instead subjected to some tilt, either because they are handheld or solidly mounted in a tilted vehicle. Using aviation convention, tilt is defined as either pitch or roll relative to the local horizontal plane; pitch is the angle between an aircraft's longitudinal axis and the local horizontal plane (positive for nose-up pitch) and roll is the angle of rotation about the longitudinal axis (positive for right wing down).

If no correction is made for tilt, heading errors will occur; for a pitch of +/−10°, for example, maximum heading errors of approximately 9° will occur at headings of about 90° and 270°, with smaller errors at other headings.

Electronic compasses, which are capable of digitally processing signals produced by electrical magnetic sensors, can be compensated numerically for tilt and other factors. For a tilted compass to make an accurate heading measurement, tilt must be taken into account, because equation (1) is no longer accurate. Typically, 3-axis electronic magnetic sensors have been used in conjunction with 2-axis tilt sensors to overcome inaccuracies that occur due to tilt. Three-axis magnetic sensors measure the Earth's magnetic field in mutually orthogonal directions.

If both the pitch ($\phi$) and roll ($\theta$) angles are measured by a tilt sensor, the following rotation equations can be used to mathematically rotate the tilted compass back to the horizontal plane, where a heading can again be calculated using equation (1):

$$X = X \cos\phi + Y \sin^2\phi - Z \cos\phi \sin\phi \quad (2)$$

$$Y = Y \cos\theta + Z \sin\theta \quad (3)$$

where z represents the Earth's magnetic field component that is orthogonal to a magnetic sensor's x and y axes and X and Y represent X and Y axis readings transformed to the local horizontal plane. Equations 2 and 3 can be solved numerically using inputs from a 3-axis magnetic sensor and at least a 2-axis tilt sensor.

In some compass applications, however, such as cell phones and watches, not enough space is available for a 3-axis magnetic sensor, which requires two sensors in one plane and a third sensor in another orthogonal plane. Thus, a solution that would allow more accurate heading measurements without the use (and increased size) of a 3-axis magnetic sensor is desired.

SUMMARY

In one aspect, a tilt-compensated compass system is disclosed. The system includes a 2-axis magnetic sensor, a tilt sensor, a memory, and a processor. The system also includes at least one value for the Earth's field strength stored in the memory. The memory may also store a set of instructions executable by the processor to calculate a magnetic field component, Z, that is orthogonal to the 2-axis magnetic sensor measurement axes using inputs from the 2-axis magnetic sensor and using the at least one stored value for the Earth's magnetic field strength.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

In exemplary embodiments, electronic compasses use sensors capable of producing an electrical signal that is proportional to the direction of the Earth's magnetic field. For highly miniaturized recreational electronic compasses that provide a readout of 8 compass points (or more), a system must be able to resolve direction to the nearest 16°, which is easily within the sensitivity of many magnetic sensors, such as anisotropic magnetoresistive sensors (AMRs), Hall-effect, GMRs, inductive coil, and flux-gate sensors.

Typically, to compensate for compass tilt in order to provide at least 16° accuracy, a 3-axis magnetic sensing system and a tilt sensor are required to solve equations (1), (2), and (3). This is because equations (2) and (3), as can be seen, require magnetic field measurements in the x-, y-, and z- directions and tilt measurements in 2 axes. By mathematically calculating field strength along one axis (such as the z-axis), however, a 2-axis, rather than a 3-axis magnetic field sensor can be used in an electronic compass that still compensates for tilt. Accordingly, such a compass can be made flatter and more compact, since one sensor, orthogonal to a relatively flat 2-axis sensor, can be eliminated.

Figure 1:
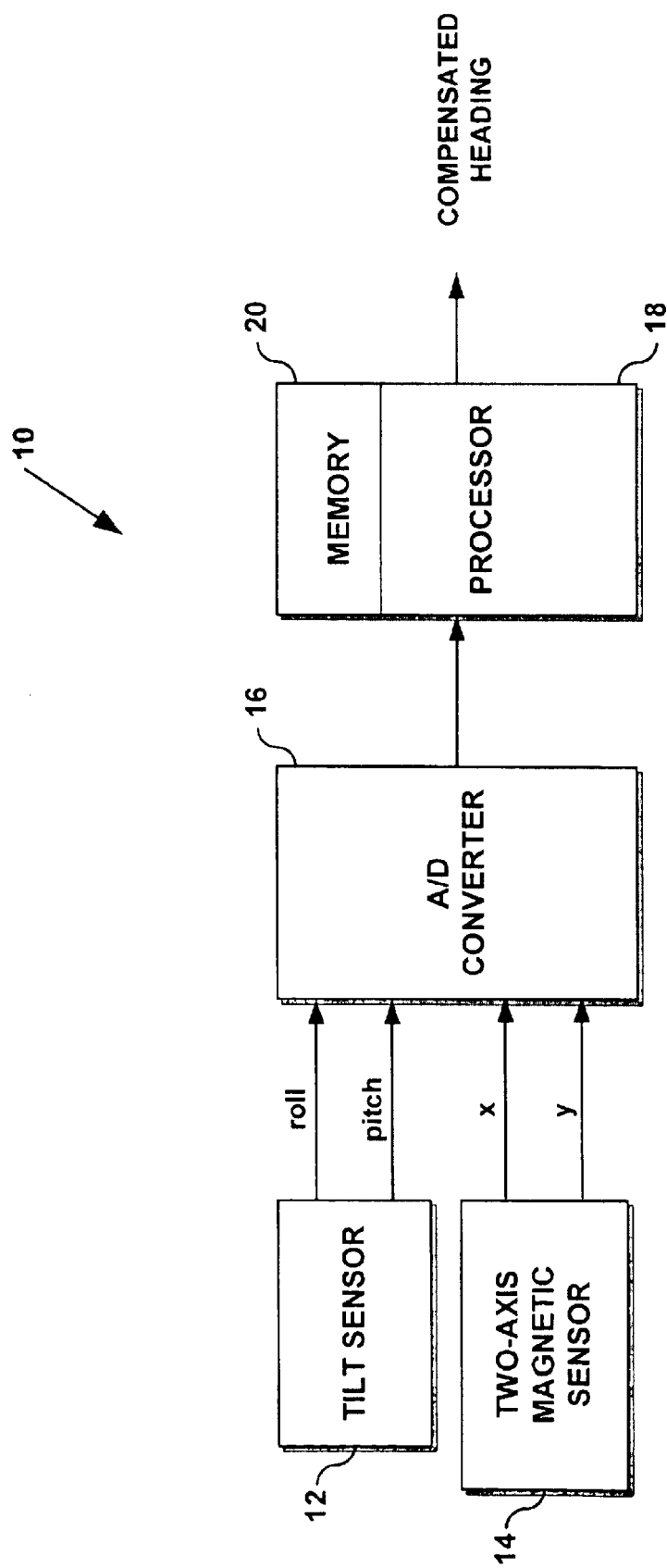
FIG. 1 is a block diagram of an exemplary compensated electronic compass.
Figure 2:
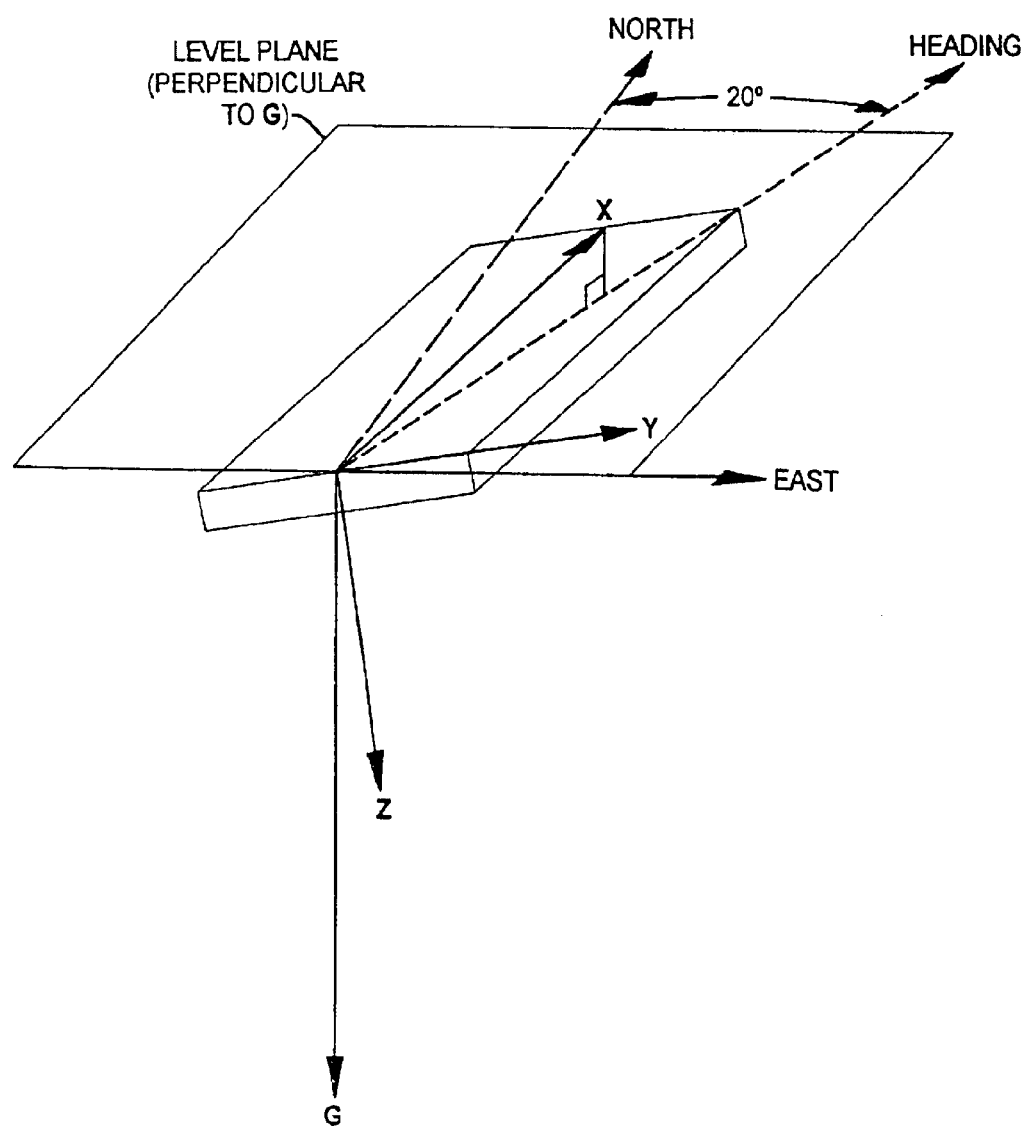
FIG. 2 illustrates the coordinate systems associated with the compass of FIG. 1.

FIG. 1 is a block diagram of an exemplary electronic compass 10. The compass includes a 2-axis magnetic sensor 14. The compass 10 measures the Earth's magnetic field with respect to a three-axis internal coordinate system as depicted in FIG. 2. In FIG. 2, the compass' internal coordinate system is denoted by x, y, and z axes, and is depicted relative to a local horizontal plane that is orthogonal to the gravity vector G. Typically, the z axis of the internal coordinate system is the downward direction relative to the compass' "level" orientation (or relative to any equipment to which the compass may be attached). The y axis is perpendicular to the z axis and extends to the right, and the x axis is perpendicular to both the y and z axes and is generally defined as the "forward" direction of the compass.

The x axis' orientation relative to magnetic north is used to determine azimuth or heading. Specifically, the angle measured clockwise from magnetic north to the x axis of the compass, in the horizontal plane, is the heading. If the compass is not level but instead has some pitch, roll, or both, then the heading (compensated for tilt) is the projection of the compass' x-axis onto the local horizontal plane. The magnetic heading of interest is the angle measured from the level component of the Earth's magnetic field to the level component of the compass' internal x axis. In FIG. 2, the tilt-compensated heading is 20°. Again using aircraft convention, the compass of FIG. 2 has positive (nose-up) pitch $\phi$ and negative (right wing up) roll ($\theta$).

Referring back to FIG. 1, inputs from a 2- or 3-axis tilt sensor 12 and the 2-axis magnetic sensor 14 are provided to an A/D converter 16. The digitized output of A/D converter 16 can then be provided to a processor 18 for compensation of tilt and other error sources. Processor 18 can use operating software and any required stored compensation values stored in memory 20 to perform heading solution calculations.

As noted above, in any tilt-compensated compass system, any pitch and roll angles must be measured (so that equations 2 and 3 can be solved); the angles can be measured using 2 or 3-axis tilt sensors, where a 3-axis sensor may yield better results due to optimum selection of a coordinate system. Accelerometer, fluidic, MEMS, or other types of tilt sensors may be used.

For recreational compasses that require relatively low accuracy, the Z component Z of the Earth's magnetic field that is orthogonal to the internal coordinate system can be mathematically derived using X and Y values measured from a 2-axis sensor using the formula:

$$Z=\sqrt{H^2-X^2-Y^2} \qquad (4)$$

where H is the magnitude of the Earth's magnetic field.

Once Z is calculated from equation (4), the value of Z can be used along with pitch and roll data to solve equations (2) and (3). In turn, once equations (2) and (3) are solved, the tilted compass can be mathematically "rotated" back to the local horizontal plane, allowing a heading to be calculated using equation (1).

Calculating Z, rather than measuring it directly with a third sensor orthogonal to a 2-axis sensor, allows for the elimination of the third sensor, so a very flat, compact sensor package that is relatively insensitive to tilt can be made—small enough to easily fit within electronic products such as watches and cellular telephones. Honeywell produces several suitable 2-axis magnetoresistive sensors, such as the HMC1002, HMC1022, and HMC1052. The system could also be used with two separate single axis sensors if necessary.

The HMC1052, for example, is a 10-pin 2-axis sensor suitable for use in the present system that comes in a surface mount package approximately 3 mm x 5 mm. The HMC1052 features two mutually orthogonal 4-element wheatstone bridges that convert magnetic fields to differential output voltages; each bridge is capable of sensing fields below 0.1 milligauss, making the sensor suitable for compassing applications. For lower resolution compassing, the HMC1052 or another sensor can be used with an 8 or 10-bit A/D converter.

For use in the United States and most of the Northern Hemisphere, the Earth's magnetic field H in equation (4) can be approximated as 0.5 gauss as a default value, yielding an accuracy of about 10° where the Earth's field can range from 0.4 to 0.6 gauss. The accuracy of a compass can be improved by setting the default field strength value more accurately, to correspond with where the compass is likely to be used. To provide either a default value or a more specific value for H, a look-up table with values for the Earth's magnetic field in various locations may be stored in memory 20 and used by processor 18 in heading calculations. Alternatively, a user could manually calibrate the compass for a particular area by rotating the compass through 360° and tilting the compass to determine the maximum field strength as measured by magnetic sensor 14. The measured field strength can then be stored.

Once roll, pitch, H, X, and Y data are stored or digitized, they can be used by processor 18 to solve equations (1) through (4) above to provide tilt-compensated heading information for display or other purposes.

Figure 3:
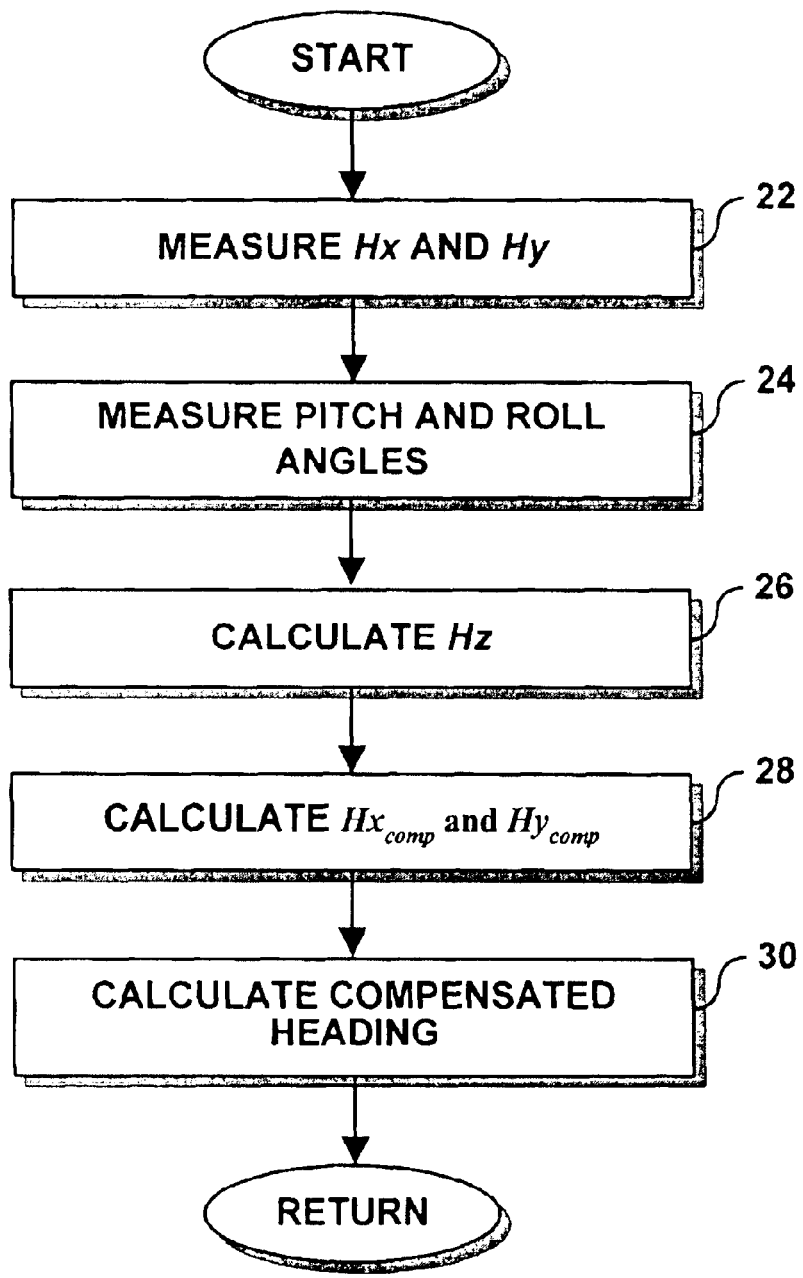
FIG. 3 is a flow chart illustrating steps that may be used to implement the compass of FIG. 1.

FIG. 3 is a flowchart illustrating an exemplary method for electronic compassing. First, at block 22, X and Y are measured by 2-axis magnetic sensor 14. Next, at block 24, the pitch ($\phi$) and roll ($\theta$) angles are measured by tilt sensor 12. Note that roll, pitch, and magnetic fields could be measured in any order, and the time required to acquire each reading may be sufficiently short that the readings are virtually simultaneous for practical purposes. This short measurement time is desirable so that the measured roll and pitch accurately coincides with the magnetic measurements.

As soon as measured X and Y values are available to processor 18, it can solve equation (4) determine Z using the stored value for H, as shown at block 26. Once Z is known, the processor can solve equations (2) and (3) to determine tilt-compensated values of X and Y (which may be referred to as $X_{comp}$ and $Y_{comp}$) using the measured pitch ($\phi$) and roll ($\theta$) angles, as shown at block 28. Using the local horizontal (that is, the tilt-compensated) components $X_{comp}$ and $Y_{comp}$, the tilt-compensated heading can be calculated as shown at block 30, at which point the heading information can be digitally displayed or transmitted.

It should be understood that the illustrated embodiments are exemplary only and should not be taken as limiting the scope of the present invention. The claims should not be read as limited to the described order or elements unless stated to that effect. Therefore, all embodiments that come within the scope and spirit of the following claims and equivalents thereto are claimed as the invention.

I claim:

1. A compass system comprising:

a 2-axis magnetic sensor;

a tilt sensor;

a memory;

a processor;

at least one value for the Earth's magnetic field strength stored in the memory; and a set of instructions stored in the memory and executable by the processor to calculate a magnetic field component, Z, that is orthogonal to measurement axes associated with the 2-axis magnetic sensor using inputs from the 2-axis magnetic sensor and using the at least one stored value for the Earth's magnetic field strength.

2. The system of claim 1, wherein the field component Z is calculated as $Z=\sqrt{H^2-X^2-Y^2}$ where H is the at least one stored value, X is a first measurement from the 2-axis magnetic sensor and Y is a second measurement from the 2-axis magnetic sensor that is orthogonal to X.

3. The system of claim 2, further comprising a set of instructions in memory and executable by the Processor to calculate local horizontal components of the Earth's magnetic field $X_{comp}$ and $Y_{comp}$ using the calculated value of Z and inputs from the tilt sensor.

4. The system of claim 3, wherein the tilt sensor is a 2-axis tilt sensor that measures pitch ($\phi$) and roll ($\theta$) angles and wherein the local horizontal components $X_{comp}$ and $Y_{comp}$ are mutually orthogonal and are calculated using the equations;

$X_{comp}=X \cos \phi + Y \sin^2 \phi - Z \cos \phi \sin \phi$ and $Y_{comp}=Y \cos \theta + Z \sin \theta$.

5. The system of claim 4, wherein a compensated heading is calculated using the equation Heading=$arcTan(Y_{comp}/X_{comp})$.

6. A method of compensating for tilt in an electronic compass having a 2-axis magnetic sensor and a tilt sensor, the method comprising:

storing at least one value for the Earth's magnetic field strength;

measuring the Earth's magnetic field strength with the 2-axis magnetic sensor; and calculating a magnetic field component, Z, that is orthogonal to the measurement axes associated with the 2-axis magnetic sensor, using the measured field strengths from the 2-axis magnetic sensor and using the at least one stored value for the Earth's magnetic field strength.

7. The method of claim 6, further comprising:

calculating the orthogonal field component Z using the equation $Z=\sqrt{H^2-X^{2-Y^2}}$ where H is the at least one stored value, X is a first measurement from the 2-axis magnetic sensor and Y is a second measurement from the 2-axis magnetic sensor that is orthogonal to X.

8. The method of claim 7, further comprising:

calculating local horizontal components $X_{comp}$ and $Y_{comp}$ of the Earth's magnetic field using the calculated value of Z and inputs from the tilt sensor, wherein the tilt sensor is a 2-axis tilt sensor that measures pitch ($\phi$) and roll ($\theta$) angles and wherein the local horizontal components $X_{comp}$, and $Y_{comp}$ are mutually orthogonal and are calculated using the equations;

$X_{comp}=X \cos \phi + Y \sin^2 \phi - Z \cos \theta \sin \phi$ and $Y_{comp}=Y \cos \theta + Z \sin \theta$.

9. A method of compensating for tilt in an electronic compass having a 2-axis magnetic sensor and a tilt sensor, the method comprising:

storing at least one value for the Earth's magnetic field strength;

measuring the Earth's magnetic field strength with the 2-axis magnetic sensor;

calculating a magnetic field component, Z, that is orthogonal to the 2-axis magnetic sensor measurement axes using the measured field strengths from the 2-axis magnetic sensor and using the at least one stored value for the Earth's magnetic field strength, wherein the orthogonal field component Z is calculated using the equation $Z=\sqrt{H^2-X^{2-Y^2}}$ where H is the at least one stored value, X is a first measurement from the 2-axis magnetic sensor and Y is a second measurement from the 2-axis magnetic sensor that is orthogonal to X;

calculating local horizontal components $X_{comp}$ and $Y_{comp}$ of the Earth's magnetic field using the calculated value of Z and inputs from the tilt sensor, wherein the tilt sensor is a 2-axis tilt sensor that measures pitch ($\phi$) and roll ($\theta$) angles and wherein the local horizontal components $X_{comp}$ and $Y_{comp}$ are mutually orthogonal and are calculated using the equations;

$X_{comp}=X \cos \phi + Y \sin^2 \phi - Z \cos \theta \sin \phi$ and $Y_{comp}=Y \cos \theta + Z \sin \theta$; and calculating a compensated heading using the equation Heading=$arcTan(Y_{comp}/X_{comp})$.

* * * * *

UNITED STATES PATENT AND TRADEMARK OFFICE
CERTIFICATE OF CORRECTION

PATENT NO. : 6,836,971 B1
DATED : April 11, 2005
INVENTOR(S) : Hong Wan

It is certified that error appears in the above-identified patent and that said Letters Patent is hereby corrected as shown below:

Column 6,
Line 27, please replace "$Z = \sqrt{H^2 - X^{2-Y^2}}$" with -- $Z = \sqrt{H^2 - X^2 - Y^2}$ --.

Signed and Sealed this

Thirty-first Day of May, 2005

JON W. DUDAS
*Director of the United States Patent and Trademark Office*